United States Patent [19]

Endo et al.

[11] Patent Number: 5,055,499

[45] Date of Patent: Oct. 8, 1991

[54] MOLDED POLYMER ARTICLE FILLED WITH INORGANIC MATERIAL AND PRODUCTION OF SAID ARTICLE

[75] Inventors: Zenichiro Endo; Shigeyoshi Hara, both of Iwakuni, Japan; Paul A. Silver, Wilmington, Del.; Hikoichiro Yamada, Iwakuni, Japan

[73] Assignee: Hercules Incorporated, Wilmington, Del.

[21] Appl. No.: 461,559

[22] Filed: Jan. 5, 1990

[30]   Foreign Application Priority Data

Jan. 11, 1989 [JP] Japan .................................... 1-2886

[51] Int. Cl.$^5$ ............................................. C08K 9/06
[52] U.S. Cl. ................................... 523/214; 523/212; 526/279

[58] Field of Search ................ 523/212, 214; 526/279, 526/276

Primary Examiner—Paul R. Michl
Assistant Examiner—Peter Szekely
Attorney, Agent, or Firm—William S. Alexander; Joanne W. Patterson

[57]     ABSTRACT

A method is disclosed for preparing filled shaped articles of metathesis polymerized poly(cycloolefins) wherein an inorganic filler material is treated with a norbornene-substituted silane coupling agent. The norbornene moiety copolymerizes with the metathesis polymerizable monomer and the silane moiety creates a bond with the filler. Products are characterized by improved physical properties.

18 Claims, No Drawings

MOLDED POLYMER ARTICLE FILLED WITH INORGANIC MATERIAL AND PRODUCTION OF SAID ARTICLE

The present invention relates to a molded polymer article filled with an inorganic material, prepared by the simultaneous polymerization and molding of a metathesis polymerizable cycloolefin in the presence of a metathesis polymerization catalyst.

More particularly, the invention relates to a molded polymer article filled with an inorganic material and having improved adhesion between the inorganic filler and the polymer by the use of an inorganic filler subjected to treatment with a specific silane coupling agent. The invention further relates to a process for the production of said polymer article.

It is known that ring-opened polymers are produced from cycloolefins by the use of a metathesis polymerization catalyst system. A process has been proposed to obtain a molded polymer article by carrying out the polymerization and molding of a metathesis polymerizable cycloolefin, such as dicyclopentadiene (DCPD) in one step in a mold using a metathesis polymerization catalyst system. The metathesis polymerization catalyst system is composed of two components consisting of a catalyst component such as tungsten chloride and an activator component such as an alkylaluminum. Two solutions are employed, each containing one of the above components and a monomer. The solutions are mixed shortly prior to polymerization and the mixture is injected into a mold where polymerization takes place (see, for example, cf. Japanese Patent Laid Open Sho 58-129013).

Such processes are very attractive from an industrial viewpoint because large-sized molded articles can be produced using an inexpensive low-pressure mold and the thus-produced article has well-balanced rigidity and impact resistance.

However, it has been found that molded articles having further improved rigidity, dimensional stability and heat distortion temperature are frequently required.

One method to achieve the improvement of the above three important properties is the use of an inorganic filler, especially the use of an inexpensive and effective glass or other inorganic reinforcing material. An inorganic filler can fully exhibit its characteristics only when the filler is firmly bonded to a resin at the interface. Since the surface energy of an inorganic filler generally having high polarity is often widely different from that of various resins, a silane coupling agent is generally used to attain high adhesion. The silane coupling agent is a compound having a part contributing to the bonding with an inorganic filler through a silanol group and a part consisting of an organic group exerting strong interaction with the resin to be bonded. Certain kinds of silane coupling agents are commercially available to enable the selection of a proper silane coupling agent for various thermosetting resins or thermoplastic resins where glass reinforcement is frequently used, for example, polyamide resin, polyester resin, epoxy resin or phenolic resin.

However, little is known about the factors that participate in the effectiveness of an inorganic filler for the above-mentioned molded polymer article prepared by the metathesis polymerization and molding of cycloolefin compounds especially concerning the effectiveness of silane coupling agents in improving the adhesion of a glass reinforcing material. Since the above molded polymer article is prepared by simultaneous polymerization and molding (hereinafter "reaction molding"), the inorganic filler must be present in the system during the polymerization step when the surface of the agent is brought into contact with the reactants. Accordingly, the coupling agent should not be one having inhibitory action against metathesis polymerization. However, the inhibitory action of a silane coupling agent is also unknown.

The above-mentioned polymer generally has a predominantly hydrocarbon structure containing a large amount of unsaturated bonds and, accordingly, is substantially free of polarity. For this reason, it has been found difficult to effect good bonding between the polymer and the reinforcing material. In order to obtain a satisfactory molded polymer article filled with an inorganic material, it has been necessary to find techniques to effect such bonding.

As a result of intensive investigation for finding a silane coupling agent for coupling an inorganic filler with a metathesis polymerized cycloolefin polymer (sometimes referred to as "metathesis polymer"), the inventors of the present invention have found that certain silane coupling agents having specific structures are capable of exhibiting excellent bonding and reinforcing performance.

In accordance with this invention, it has been found that a silane coupling agent having a cycloolefin substituent group which exhibits metathesis polymerization activity and which group enters into the polymerization reaction imparts excellent properties as a silane coupling agent between an inorganic filler and a metathesis polymerized cycloolefin.

Specifically, the present invention is directed to:

(1) A molded polymer article filled with an inorganic filler that has been surface treated with a silane coupling agent having the general formula:

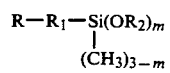

as hereinafter more clearly defined, said polymer being produced by the reaction molding of at least one metathesis polymerizable cycloolefin compound under the influence of a metathesis polymerization catalyst.

(2) A process for the production of a molded polymer article filled with an inorganic material, as defined in (1) above, by the reaction molding of at least one metathesis polymerizable cycloolefin compound under the influence of a metathesis polymerization catalyst.

The mechanism by which such silane treatment agent gives good adhesion between an inorganic filler and a metathesis polymer prepared by reaction molding is that the surface structure and consequently the surface energy of the treated inorganic filler are made to be similar to those of the monomer and the metathesis polymer by the presence of a metathesis polymerizable cycloolefin group in the silane coupling agent which improves the wettability of the surface. Additionally, at least a part of the metathesis polymerizable cycloolefin group in the silane coupling agent undergoes metathesis polymerization during the reaction molding step, thereby forming a chemical bond between the coupling agent and the metathesis polymer.

The silane coupling agent employed in the product and process of this invention has the general formula:

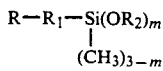

In the formula, R is a) a norbornene structure unit expressed by:

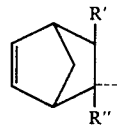

wherein R' and R" are same or different and represent hydrogen or lower alkyl groups and the dotted line represents an open valence or b) another metathesis polymerizable strained-ring cycloolefin group, for example, a condensed cyclopentene ring expressed by the formula:

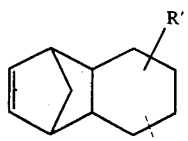

and $R_1$ is a bivalent or trivalent organic group generally having a carbon number of 6 or less and free from a group that inhibits the metathesis polymerization. When the group $R_1$ is trivalent, it forms a cyclic structure together with the group R. Alternatively, $R_1$ can be nothing at all in which case R is attached directly to the silicon atom. $R_2$ is a univalent alkyl group or acyl group having a carbon number of 6 or less (the alkyl group and acyl group may contain a polar group such as ether or ester group) and m is an integer from 1 to 3.

Especially preferable compounds among the above compounds are those of m=3 or expressed by the formula:

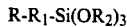

from the viewpoint of the affinity to the surface of glass, a representative inorganic filler.

When the silane coupling agent is to be bonded with an inorganic filler such as glass, $R_2$ is a group that does not remain in coupled state during hydrolysis and, accordingly, a proper kind of group can be selected according to the conditions of the treatment of the organic filler with the silane coupling agent.

There are generally two methods for the application of a silane coupling agent. The first method is the use of an inorganic filler pretreated with the silane coupling agent and the second method is the addition of the silane coupling agent to a polymerizable solution to effect the simultaneous silane treatment of the inorganic filler and polymerization of the monomer and the cycloolefin moiety on the silane compound.

The latter method has the apparent merit of not requiring a separate step for carrying out the silane treatment of the filler. However, pretreatment of the filler has several advantages which make it the preferred treatment. In order to assure a sufficient contacting of the filler with the silane compound when using the simultaneous treating and polymerization method, it is necessary to employ a greater amount of the silane compound than would be required by the pretreatment technique, resulting in the presence of silane treating agent throughout the entire polymer body including the surface. This can lead to problems with post-treatment, e.g., adhesion of paint or other coatings. Moreover, the presence of the silane, depending upon the silane that one chooses, can be detrimental to the activity of the catalyst system and thus interfere with the polymerization reaction. Use of a greater than necessary amount of the coupling agent also adds an element of cost to the process which it is desirable to avoid.

In the case of the pretreatment method, the silane coupling agent diluted with a solvent is brought into contact with the inorganic filler and is fixed to the surface of the filler by drying and heat-treating. The most preferable solvent from the industrial point of view is water. A mixture of water and a polar organic solvent such as alcohol or acetone can also be employed. A proper solvent is selected taking into consideration the miscibility with the coupling agent and speed of the treatment process.

The group $—OR_2$ in the silane coupling agent is a hydrolyzable group in which $R_2$ generally is methyl, ethyl, methoxyethyl, acetyl and the like. A compound wherein $R_2$ is methyl is producible from inexpensive raw material and is used in general as a common silane coupling agent. From the point of view of hydrolysis and ease of reaction, compounds where $R_2$ is an acyl group, e.g., acetyl are preferred.

Suitable compounds can readily be prepared via known production processes. A norbornene structure can be introduced into a silane by reacting cyclopentadiene with a silane compound having an unsaturated bond capable of acting as a dienophile in a Diels-Alder reaction using cyclopentadiene as the diene compound.

The reaction can be expressed by the following general formula:

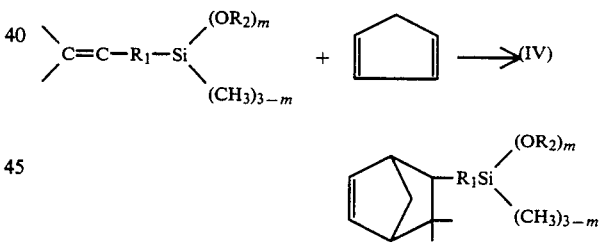

Some silanes having the above unsaturated bond are in industrial production as silane coupling agents for unsaturated polyesters or the raw material for such coupling agents and these compounds can be easily converted to the silane coupling agent to be used in the present invention. Accordingly, the method is the most advantageous method.

Especially preferable examples are cited below in the form of silane coupling agents.

Norbornenyltriethoxysilane, derived from a vinylsilane compound:

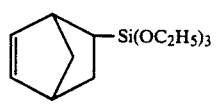

(Methylnorbornenecarboxypropyl)trimethoxysilane, derived from a methacrylsilane compound:

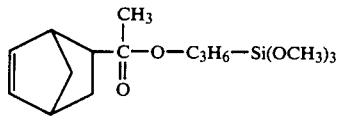

and (norbornenylmethyl)triethoxysilane, derived from an allylsilane compound

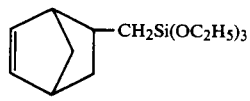

A process for utilizing the addition reaction of the silyl hydride (≡SiH) group of a trialkoxysilane to either one of the carbon-carbon double bonds of a cyclodiene (hydrosilation reaction). This reaction can be expressed by the following general formula:

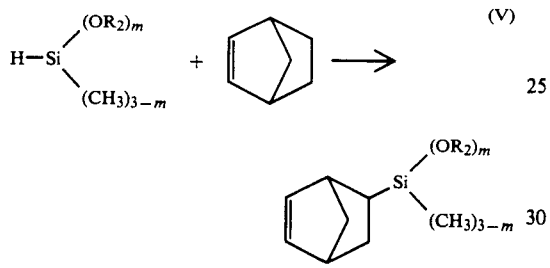

Trihalosilane and trialkoxysilane are easily available raw materials mass-produced as intermediate raw materials for various silane coupling agents.

Mass-produced and easily available examples of the cycloolefins applicable in the hydrosilation reaction are cyclopentadiene, dicyclopentadiene, norbornadiene, cyclooctadiene and the like.

The following two kinds of compounds are formed by the use of dicyclopentadiene as the cycloolefin, and both of the compounds have metathesis polymerizability:

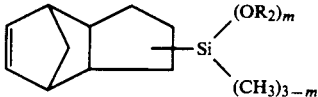

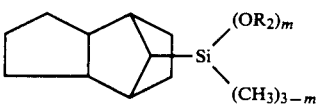

When the cyclodiene is norbornadiene, the compound of formula (I-1) is produced. Any of the compounds of 1-1 through 1-5 can equally be made by starting with a trihalosilane and, after adding the norbornene moiety, reacting the halo-substitution to convert it to (—OR$_2$) or CH$_3$—.

In the case of using a cycloolefin compound having one metathesis polymerizable cycloolefin group and one chain olefin group active to metathesis reaction, for example vinylnorbornene, as a variation of the above case, the following two kinds of silane adducts are obtained via the hydrosilation reaction. The compound of formula (I-6) is included in the definition of the silane coupling agent of the present invention. The compound of formula (I-7) is not included in the silane coupling agent judged from its structure; however, it can participate in the metathesis reaction by the vinyl group and act as a metathesis reactive silane coupling agent. Accordingly, the addition products of the compounds of vinyl norbornene and similar compounds and a silane can be used as the silane coupling agent of the present invention.

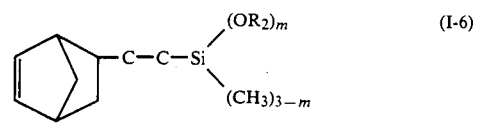

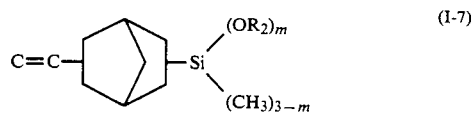

A silane coupling agent having a metathesis polymerizable cycloolefin group introduced thereinto can be prepared by reacting a haloalkane-substituted silane with an alkali metal cyclopentadienyl to introduce a cyclopentadienyl group which can react as a diene component with olefins. For example,

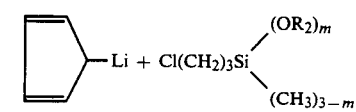

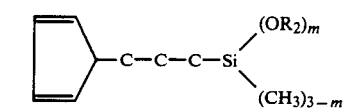

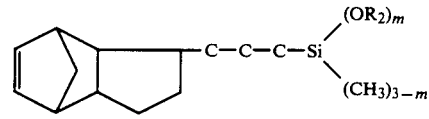

A silane coupling agent having a metathesis polymerizable cycloolefin introduced therein can be prepared by reacting a functional compound containing a metathesis polymerizable cycloolefin group with a silane compound having a group reactive with said functional compound.

For example, the aforementioned compound of formula (I-2) can be prepared by the following reaction:

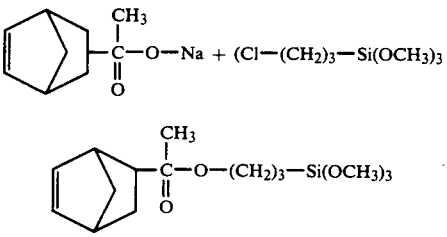

As can be seen, the preferable silane coupling agent is a compound easily produced by one or another of the above processes. Among these compounds, those containing a bulky cycloolefin group bonded directly or through a short carbon chain to the silicon atom are preferable from the viewpoint of adhesion.

The most commonly used inorganic filler is glass reinforcing material. The glass may be in any form such as fibrous, powder or flake.

The glass reinforcing material can be woven or knit cloth produced by weaving or knitting glass filaments, a continuous strand, nonwoven mat produced by spreading strands of glass filaments in the form of a random coil on a plane and fixing with a binder, a chopped strand nonwoven mat produced by randomly interlocking cut fiber strands on a surface and fixing with a binder, a chopped strand preform produced by spraying said chopped strands against a steric form and fixing with a binder, a nonwoven glass fiber cloth produced by conventional methods for the production of a nonwoven cloth, for example, a cloth produced by needle punch process, or a unidirectionally oriented cloth produced by aligning glass fiber tow in one direction in parallel on a plane and laminating with another kind of mat or fixing the lateral direction by stitching. In addition to the above, glass braid and three-dimensional woven fabric of glass fiber can be cited as specific examples.

The glass fillers having a form other than fibrous form are, for example, milled glass produced by pulverizing glass, so-called microfibrous glass having powdery form with high aspect ratio, glass microballoons, glass flakes, etc.

The application methods and the reinforcing effects are generally different between the glass-fiber reinforcing material and the powdery glass reinforcing material when these materials are to be used for the reinforcement of a metathesis polymer in the present invention.

The glass-fiber reinforcing material is generally employed by disposing a mat or preform of the material in a mold and pouring a reactive monomer liquid into the mold. It is necessary in the above method that the monomer liquid be sufficiently impregnated into the fiber bundles before solidification to minimize the formation of voids in the glass fiber bundles. The reinforcing effect is high and the impact resistance, as represented, for example, by notched Izod impact strength, can be remarkably improved. In addition, improvements are observed in the rigidity, strength, dimensional stability and heat distortion temperature.

The powdery glass reinforcing material are preferably dispersed in the reactive monomer liquid and the dispersion charged to the mold.

The vinylsilane-type silane coupling agent can be applied to the glass reinforcing material by established methods for the application of conventional silane coupling agents to glass reinforcing material. In the case of a glass fiber reinforcing material containing chopped strand or continuous strand as a base material, the silane coupling agent can be added as a component of a spinning lubricant to apply the agent simultaneously with spinning.

In addition to glass, any inorganic filler having groups capable of bonding with a silane on the surface can improve the adhesion to a metathesis polymer by the use of the silane treatment agent of this invention. Oxide-type inorganic materials are naturally included in such inorganic fillers. Moreover, nitrides and carbides frequently exhibit the effect of the silane coupling agent, since these compounds actually have oxidized surfaces bearing oxygen-containing groups in general.

Such fibrous inorganic fillers include wollastonite, potassium titanate, alumina fiber and the like and plate inorganic fillers such as various kinds of mica.

Examples of powdery fillers are kaolin, burnt clay, quartz powder, silica powder, feldspar powder, talc, aluminum silicate, alumina and powder of various ceramics. Various inorganic pigments are specific examples of inorganic fillers. For example, the silane coupling agent can be used to improve the dispersibility of a fine powder pigment such as titanium oxide, iron black and the like.

Examples of the metathesis polymerizable cycloolefin monomers in which the present invention can be applied are cycloolefins having one to three norbornene structures such as dicyclopentadiene, tricyclopentadiene, cyclopentadienemethylcyclopentadiene codimer, 5-ethylidenenorbornene, norbornene, norbornadiene, 5-cyclohexenylnorbornene, 1,4,5,8-dimethano-1,4,4a,5,6,7,8,8a-octahydronaphthalene, 1,4-methano-1,4,4a,5,6,7,8,8a-octahydronaphthalene, 6-ethylidene-1,4,5,8-dimethano-1,4,4a,5,7,8,8a-heptahydronaphthalene, 6-methyl-1,4,5,8-dimethano-1,4,4a,5,7,8,8a-heptahydronaphthalene, 1,4,5,8-dimethano-1,4,4a,5,8,8a-hexahydronaphthalene, ethylene(5-bisnorbornene), or mixtures thereof. Dicyclopentadiene or a monomer mixture composed mainly of dicyclopentadiene is especially preferred.

Other metathesis polymerizable cyclic compounds containing hetero atoms such as oxygen, nitrogen and the like or containing polar substituents may be used as required. Such monomers are generally used by copolymerizing with dicyclopentadiene. Preferably, the polar monomers will also have the norbornene structure unit and the polar group is preferably an ester group, ether group, cyano group or N-substituted imido group.

Examples of the copolymerizing monomer include 5-methoxycarbonylnorbornene, 5-(2-ethylhexyloxy)-carbonyl-5-methylnorbornene, 5-phenyloxymethylnorbornene, 5-cyanonorbornene, 6-cyano-1,4,5,8-dimethano-1,4,4a,5,6,7,8,8a-octahydronaphthalene, and N-butylnadic acid imide.

It is necessary that the metathesis polymerizable monomers be those containing the lowest possible amount of impurities which inactivate the metathesis polymerization catalyst.

As the main catalyst component of the metathesis polymerization catalyst system used in the present invention are used salts such as halides of tungsten, rhenium, tantalum, molybdenum and the like, especially tungsten compounds. Among tungsten compounds tungsten halides and tungsten oxyhalides are preferred. More particularly, tungsten hexachloride and tungsten oxychloride are preferred. Organo ammonium tungstate or molybdates may also be used. However, such tungsten or molybdenum salts undesirably initiate cationic polymerization immediately when added directly to the monomer. It is, therefore, preferable that the tungsten salt compounds be previously suspended in an inert solvent such as benzene, toluene or chlorobenzene and solubilized by the addition of a small amount of an alcoholic compound or a phenolic compound. A Lewis base or a chelating agent is then added to the catalyst in an amount of about 1–5 mol per 1 mol of the tungsten compound in order to prevent undesirable premature polymerization. Those additives may include acetylacetone, acetoacetic acid alkyl esters, tetrahydrofuran, benzonitrile and the like.

Under such situations, the monomer solution (Solution A) containing the catalyst component has sufficiently high stability for practical use.

The activator components of the metathesis polymerization catalyst system include organometallic compounds chiefly comprising alkylated compounds of metals of group I-group III in the periodic table, preferably, tetraalkyltins, alkylaluminum compounds and alkylaluminum halide compounds such as diethylaluminum chloride, ethylaluminum dichloride, trioctylaluminum, dioctylaluminum iodide, tetrabutyltin and the like. The organometallic compound used as the activator component is dissolved in the monomer to form the other reactive solution (referred to as Solution B).

According to the present invention, in principle, the molded polymer articles are produced by mixing the Solution A with the Solution B. The polymerization reaction, however, starts very rapidly when the above-mentioned composition is used and, consequently, undesirable initiation of hardening often occurs before the mold is completely filled with the mixed solution. In order to overcome this problem, it is desirable to add a polymerization moderating agent to the activator solution. As such moderators are generally used Lewis bases, particularly, ethers, esters, nitriles and the like. Examples of the moderators include ethyl benzoate, butyl ether diglyme and the like.

When a tungsten compound is used as the catalyst component, the ratio of the tungsten compound in the metathesis polymerization catalyst system to the above-mentioned monomers is about 1000:1 to about 15000:1, and preferably about 2000:1 on molar base. When an alkylaluminum compound is used as the activator component, the ratio of the aluminum compound to the above-mentioned monomers is about 100:1 to about 3000:1 and preferably around a ratio of about 300:1 to about 1000:1 on molar base. The amount of the moderator may be adjusted by experiments depending upon the reactivity of the catalyst system.

A variety of additives may be used practically in the molded polymer articles of the present invention to improve or to maintain characteristics of the polymer. The additives include fillers, pigments, antioxidants, light stabilizers, flame retardants, macromolecular modifiers and the like. These additives must be added to the starting solutions, since they cannot be added after the solutions are polymerized to the molded polymer articles.

They may be added most easily to either one or both of the Solution A and the Solution B. The additives should be ones being substantially unreactive with the highly reactive catalyst component and activator component in the solutions to avoid practical problems. If a reaction between the additive and the catalyst component or the activator component is unavoidable but does not essentially inhibit the polymerization, the additives can be mixed with the monomers to prepare a third solution, and the third solution is mixed with the first and/or second solutions immediately before polymerization.

The molded polymer article produced by the present invention may preferably contain an antioxidant. Preferably, a phenolic- or amine-antioxidant is added to the solution in advance. Examples of the antioxidants include 2,6-t-butyl-p-cresol, N,N'-diphenyl-p-phenylenediamine, tetrakis[methylene(3,5-di-t-butyl-4-hydroxycinnamate)]methane and the like.

The molded polymer article produced by the present invention may also contain other polymers, which are added to the monomer solution. Among polymers, elastomers are more preferable, since the addition of elastomer is effective in improving the impact strength of the molded articles and controlling the viscosity of the solution. Examples of elastomers to be used for the above purpose include a wide variety of elastomers such as styrene-butadiene rubber, styrene-butadiene-styrene triblock rubber, styrene-isoprenestyrene triblock rubber, polybutadiene, polyisoprene, butyl rubber, ethylene-propylene-diene terpolymer, nitrile rubber and the like. When the molded article of the present invention contains a large amount of residual monomer, it sometimes emits a characteristic monomer odor. The residual monomer can be decreased by the use of $\alpha,\alpha,\alpha$-trichlorotoluene, a trichloroacetic acid ester, phthaloyl chloride, benzoic anhydride, phosphorus oxychloride, benzenesulfonic acid chloride and the like.

As described above, the molded polymer articles of the present invention are prepared by reaction molding. The reaction molding method includes a resin injection process comprising the mixing of a catalyst and a monomer with a simple mixer such as a static mixer and the injection of the mixture or a previously mixed premix into a mold and a reaction injection molding process comprising the impingement mixing of the Solution A and the Solution B containing divided catalyst system in a mix head and the substantially immediate injection of the mixture into a mold.

In both the RIM process and the resin injection process, the mixture can be introduced into the mold under relatively low pressure, so that an inexpensive mold is usable. The temperature in the mold increases rapidly by the heat of reaction upon the start of the polymerization reaction in the mold, so that the polymerization reaction is completed in a short time. The molded article of the invention can be removed easily from the mold without using a releasing agent.

As mentioned above, the application of the inorganic filler such as a glass reinforcing material is carried out by placing the material into the mold in advance in the case of long fibers or in the case of short fibers or particulate material, dispersing the material in at least one of the reactive solutions A and B and injecting the solution into the mold. The merits and demerits of each method have been mentioned before.

The physical properties of the polymer are generally improved by the reinforcing effect of the inorganic filler in proportion to the amount of the reinforcing material owing to the good bonding realized by the use of the specific silane coupling agent of the present invention. Accordingly, the amount of the inorganic filler can be determined according to the physical properties required by the use. A larger amount of the inorganic filler is generally required for attaining higher rigidity. However, in the case of fibrous inorganic filler, as the loading increases, it becomes more difficult to impregnate the reactive solution into the gaps between single filaments, in the case of a powdery filler, the fluidity of the reactive solution containing dispersed powder decreases as the amount of the filler added to the article is increased. Accordingly, there is a fundamental technical limitation in the amount of the filler. The limitation is dependent upon the dimension of single filaments and the morphology of the aggregate of fibers even in the same kind of fiber. The optimization of the above factors is necessary for the production of a satisfactory reinforced material.

In general, the volume fraction of the inorganic filler usable is preferably 0.03–0.5, more preferably 0.05–0.4.

The inorganic filler need not necessarily be distributed uniformly in the molded article and the optimum distribution, concentrated in predetermined areas, can be selected for the better satisfaction of specific performance requirements. Locally concentrated distribution can be easily attained in the case of disposing a fibrous aggregate in a mold. For example, when the rigidity, etc., are to be increased at a specific point in one molded article, the fiber aggregate reinforcing material is placed exclusively at the corresponding point or is placed at that point in higher concentration. In the case of efficiently increasing the flexural rigidity of a plate, the concentration of the reinforcing material can be made higher at the surfaces. On the other hand, when a flat and smooth surface is required, a glass veil produced by interlocking glass fibers of fine denier may be placed exclusively at the surface, although this involves some sacrifice of the reinforcing effect. Furthermore, an inorganic fiber veil, paper or the like may be placed exclusively at the surface.

The molded polymer article filled with an inorganic material and produced by the above process has improved mechanical and thermal characteristics and can be suitably used in applications required to have higher rigidity, dimensional stability, heat-distortion temperature, etc., than those of conventional molded polymer articles. The articles can be used in a variety of uses, for example, parts of various ground or water transportation vehicles, including automobiles, motorbikes, boats and snowmobiles, parts of various self-propelled or mobile machines for industry, leisure and sports such as golf carts and tractors and housings of electrical and electronic apparatus and machinery.

The invention described herein is illustrated in detail by the following examples and comparative examples. These examples are solely for explanation and do not limit the scope of the invention.

EXAMPLE 1

Preparation of Starting Materials

High purity tungsten hexachloride (19.8 g or 0.05 mol) was added to 90 ml of anhydrous toluene under a nitrogen stream. The obtained mixture was added to a solution produced by dissolving 0.925 g of t-butanol in 5 ml of toluene, stirred for 1 hour, then added to a solution consisting of 11.05 g (0.05 mol) of nonylphenol and 5 ml of toluene and stirred for 1 hour under nitrogen purge. To this mixture, 10 g of acetylacetone was added and the mass was purged with nitrogen overnight with stirring to remove the by-product hydrogen chloride gas. A part of the toluene distilled off from the system was replenished to obtain a concentrated solution of the catalyst which was 0.5M in tungsten.

A concentrated 1.0M solution of aluminum alkyl activator was prepared by mixing 5.70 g of d-n-octylaluminum iodide, 31.17 g of tri-n-octylaluminum and 13.42 g of diglyme (dimethyl ether of diethylene glycol) under a nitrogen stream and diluting the mixture with dicyclopentadiene to 100 ml in total.

A commercially available reagent of norbornenyltriethoxysilane made by Shin-Etsu Silicon Co. was used as the agent (I-1).

The (norbornenylmethyl)triethoxysilane (I-3) was synthesized by reacting 240 g of cyclopentadiene with 500 g of allyltriethoxysilane in a 2 liter autoclave in a nitrogen atmosphere at 175° C. for 6 hours. The residual cyclopentadiene, dicyclopentadiene, cyclopentadiene trimer and allyltriethoxysilane were completely distilled off from the reaction product to obtain 480 g of the agent (I-3).

The (methylnorbornenecarboxypropyl)trimethoxysilane (I-1) was synthesized by reacting 400 g of propyltrimethoxysilane methacrylate with 105 g of cyclopentadiene in a 2 liter autoclave in nitrogen atmosphere at 120° C. for 2 hours. The residual cyclopentadiene, dicyclopentadiene, cyclopentadiene trimer and propyltrimethoxysilane methacrylate were completely distilled off from the reaction product to obtain 440 g of the agent (I-2).

To test for metathesis polymerization inhibition and adhesion of various silane coupling agents, the inner faces of jar-type glass vessels were treated with solutions of the silane coupling agents listed in Table 1 and heat-treated at 120° C. for 10 minutes to obtain glass vessels having inner faces treated with the above silane coupling agents. Details of the glass treatment procedure are recorded in Table 1 along with other silane coupling agents employed as comparators.

TABLE 1

| Silane Coupling Agents Used in Examples | | |
|---|---|---|
| Abbreviation | Structure of Silane Coupling Agent | Medium for Glass Treatment |
| I-1 | Norbornenyltriethoxysilane | Water, Ethanol (pH 3) |
| I-2 | (Methylnorbornenecarboxypropyl)trimethoxysilane | Water, Ethanol (pH 3) |
| I-3 | (Norbornenylmethyl)triethoxysilane | Water, Ethanol (pH 3) |
| Comparison 1 | ($\gamma$-Methacrylo)propyltrimethoxysilane | Water (pH 4.0) |
| Comparison 2 | N-$\beta$-(N-vinylbenzylaminoethyl)$\gamma$-aminopropyltrimethoxysilane hydrochloride | Water |
| Comparison 3 | $\gamma$-Aminopropyltriethoxysilane | Water |
| Comparison 4 | $\gamma$-Chloropropyltrimethoxysilane | Water (pH 4.5) |

Separately, the above concentrated solution of main catalyst and the concentrated solution of activator prepared in Example 1 were individually added to a monomer mixture consisting of 96.5 wt. % of dicyclopentadiene and 3.5 wt. % of ethylidenenorbornene to obtain a reactive solution A containing 0.001M of tungsten and a reactive solution B containing 0.003M of aluminum.

The solutions A and B were put into individual syringes in an amount of 10 ml each, maintained at 30° C. and injected at the same time into the above treated glass vessel. When the solutions were completely mixed, the stirrer was taken out of the mixture, a thermocouple was inserted into the mixture in place of the stirrer and the period from the end of the injection from the syringes of both solutions to the point when the temperature of the mixture reached 100° C. was measured as the polymerization time.

The results are shown in the Table 2. The influence of the silane coupling agent on the metathesis polymerization can be estimated by comparing the polymerization times of the agents. The agents (I-1, (I-2) and (I-3) have little influence on the polymerization time. Whether the formed solid polymers were firmly bonded to the glass vessel or easily peelable from the wall was observed, and the results are also shown in the Table 2. The molded articles were firmly bonded only to the glass vessels which had been treated with the silane (I-1), (I-2) or (I-3) and were firmly adhered to the glass. The other articles molded into glass vessels treated with other coupling agents or into untreated vessels were spontaneously or readily separated from the glass. The above findings demonstrate, qualitatively, that a metathesis polymer exhibits high adhesion to the glass treated with the silane coupling agent (I-1), (I-2) or (I-3).

TABLE 2

| Silane Coupler for Treatment | Polymerization Time (sec) | Adhesion of Resin to Glass Vessel |
|---|---|---|
| I-1 | 38 | Adhesion |
| I-2 | 41 | Adhesion |
| I-3 | 39 | Adhesion |
| Comparison 1 | 55 | Peeling |
| Comparison 2 | 62 | Peeling |
| Comparison 3 | 71 | Peeling |
| Comparison 4 | 53 | Peeling |
| Untreated | 35 | Peeling |

EXAMPLE 2

Glass microscope slides were used in place of the glass vessels of Example 1 and the surfaces of the slides were treated with the silane coupling agents.

Separately, 10 ml each of the reactive solutions A and B prepared in the same manner as those of Example 2 were put into individual syringes. Molded plates were prepared by a miniature bench RIM machine to extrude the contents of the syringes at equal rates, eject both liquids through nozzles to effect impingement mixing and then inject the mixture into a small mold having a silane-treated glass plate attached to one of its inner surfaces whereby polymerization took place in contact with the glass plate. The glass plates treated with the coupling agent (I-1), (I-2) and (I-3) were broken into a number of pieces by the shrinkage of the formed resin, but each piece remained firmly bonded to the resin. In contrast, the glass plate treated with the comparative silane treatment agents 1-4 and the untreated glass plate were only broken into two pieces. The resin was readily peeled off the plates treated with the comparator (I-4) or those not treated.

EXAMPLE 3

Woven glass cloths (plain weave fabric having density of 215 g/m² and a thickness of 0.22mm), which had been subjected to heat treatment to burn off the spinning finishes and clean the surface, were immersed in the solutions of each silane coupling agent of Table 1, removed from the solutions, squeezed with a roller, dried in air for 24 hours and heat-treated at 120° C. for 10 minutes in a hot-air oven.

Ten pieces of the woven glass cloths treated by the above procedure were stacked in a flat mold having dimensions of 30 cm×30 cm and a depth of 3.5 mm. Separately, a reactive solution B having an aluminum content of 0.003M was prepared by dissolving SBR-Stereon 720 (product of Firestone Tire & Rubber Co.) in a monomer composition same as that of the Example 1 at a concentration of 2 wt. % and further dissolving a concentrated main catalyst solution and a concentrated activator solution into the above solution in the same manner. Both solutions were subjected to impingement mixing with a practical RIM molding machine and injected into the above flat mold to obtain a metathesis molded polymer plate reinforced with woven glass cloth and having a glass fiber content (volume content) of 22%.

Test samples were cut from the molded plate and the flexural strength and modulus were measured on each sample. The results are shown in Table 3. It is clear from the table that the composite plate containing the glass cloth treated with the agent (I-1), (I-2) or (I-3) exhibits high flexural strength and flexural modulus compared with the composite plates produced by using woven cloth treated with a silane coupling agent having no norbornene group and the composite plate containing a woven cloth free from silane treatment. The flexural strength and flexural modulus of a glass fiber-reinforced resin material are considered as the properties in which the level of the adhesion between the glass fiber and the resin is most sensitively reflected. Accordingly, the table shows that the coupling agents (I-1), (I-2) and (I-3) are effective in attaining high adhesion.

TABLE 3

| Used Silane Coupling Agent | (I-1) | (I-2) | (I-3) | Comp. 1 | Comp. 2 | Comp. 3 | Comp. 4 | Untreated |
|---|---|---|---|---|---|---|---|---|
| Composite Plate | | | | | | | | |
| Flexural Strength (kg/cm²) | 1640 | 2240 | 1730 | 1290 | 910 | 1320 | 1230 | 1370 |
| Flexural Modulus (Kg/cm²) | 81,000 | 100,300 | 81,700 | 61,500 | 43,500 | 57,500 | 60,500 | 68,500 |

It is also seen from the above experiments that the flexural strength and flexural modulus attained by the use of inadequate silane coupling agent are lower than those attained by using untreated glass cloth.

What is claimed is:

1. A method of preparing a reaction molded shaped article of a metathesis polymerized poly(cycloolefin) filled with an inorganic filler material which comprises polymerizing the poly(cycloolefin) in contact with an inorganic filler material that has been surface-treated with a silane coupling agent having the general formula:

$$R-R_1-Si(OR_2)_m \\ | \\ (CH_3)_{3-m}$$

wherein R represents a) a norbornene structure unit expressed by the general formula:

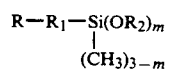

wherein R' and R" are the same or different and represent hydrogen or lower alkyl groups and the dotted line represents an open valence or b) a condensed cyclopentene ring expressed by the general formula:

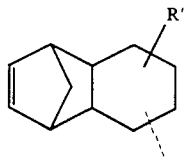

wherein $R_1$ is a bivalent organic group, a trivalent organic group that forms a cyclic structure together with the group R, or is nothing at all, in which case R is attached directly to the silicon atom, said organic radicals having six carbon atoms or less and being free from a group that inhibits metathesis polymerization; $R_2$ is a univalent alkyl or acyl group having six carbon atoms or less and m is an integer from 1 to 3.

2. The method of claim 1 wherein the filler has been surface-treated with the silane coupling agent prior to contacting the filler material with the metathesis polymerizable cycloolefin.

3. The method of claim 1 wherein the silane coupling agent is dissolved or suspended in the metathesis polymerizable cycloolefin and the surface treatment of the filler material takes place upon contacting of the filler material with the metathesis polymerizable cycloolefin.

4. The method of claim 2 wherein the metathesis polymerizable cycloolefin is dicyclopentadiene.

5. The method of claim 4 wherein the inorganic filler material is glass.

6. The method of claim 5 wherein the glass is in fabric form.

7. The method of claim 5 wherein the glass is in the form of continuous filaments.

8. The method of claim 5 wherein the glass is in powder form.

9. The method of claim 5 wherein the glass is in flake form.

10. A reaction molded shaped article of a metathesis polymerized poly(cycloolefin) filled with an inorganic filler material that has been surface treated with a silane coupling agent having the general formula:

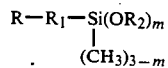

wherein R represents a) a norbornene structure unit expressed by the general formula:

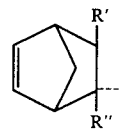

wherein R' and R" are the same or different and represent hydrogen or lower alkyl groups and the dotted line represents an open valence or b) a condensed cyclopentene ring expressed by the general formula:

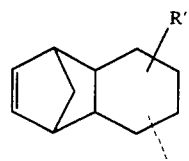

wherein $R_1$ is a bivalent organic group, a trivalent organic group that forms a cyclic structure together with the group R, or is nothing at all, in which case R is attached directly to the silicon area, said organic group having six carbon atoms or less and being free from a group that inhibits metathesis polymerization; $R_2$ is a univalent alkyl or acyl group having six carbon atoms or less and m is an integer from 1 to 3.

11. The molded article of claim 10 wherein the cycloolefin is principally comprised of dicyclopentadiene.

12. The molded article of claim 11 wherein the inorganic filler is glass.

13. The molded article of claim 11 wherein the glass is in fabric form.

14. The molded article of claim 11 wherein the glass is in the form of continuous filaments.

15. The molded article of claim 11 wherein the glass is in powder form.

16. The molded article of claim 11 wherein the glass is in flake form.

17. The molded article of claim 10 wherein the silane coupling agent is norbornenyltriethoxysilane.

18. The method of claim 12 wherein the silane coupling agent is norbornenyltriethoxysilane.

* * * * *

UNITED STATES PATENT AND TRADEMARK OFFICE
CERTIFICATE OF CORRECTION

PATENT NO. : 5,055,499

DATED : October 8, 1991

INVENTOR(S) : Zenichiro Endo; Shigeyoshi Hara; Paul A. Silver and Hikoichiro Yamada It is certified that error appears in the above-identified patent and that said Letters Patent is hereby corrected as shown below:

In the Claims, Col. 16, line 25, "silicon area" should read -- silicon atom --; and In the Claims, Col. 16, line 45, "The method" should read -- The molded article --.

Signed and Sealed this

Twenty-third Day of February, 1993

Attest:

STEPHEN G. KUNIN

*Attesting Officer*   *Acting Commissioner of Patents and Trademarks*